United States Patent [19]

Okazoe

[11] 4,122,216

[45] Oct. 24, 1978

[54] FERRO-MAGNETIC ACICULAR PARTICLES FOR RECORDING MEDIUM AND PROCESS FOR PREPARING THE SAME

[75] Inventor: Akira Okazoe, Ibaragi, Japan

[73] Assignee: Hitachi Maxell, Ltd., Japan

[21] Appl. No.: 811,951

[22] Filed: Jun. 30, 1977

Related U.S. Application Data

[63] Continuation of Ser. No. 633,365, Nov. 19, 1975, abandoned, which is a continuation of Ser. No. 551,651, Feb. 21, 1975, abandoned, which is a continuation of Ser. No. 273,165, Jul. 19, 1972, abandoned.

[30] Foreign Application Priority Data

Oct. 19, 1971 [JP]  Japan .................................. 46-83071
Feb. 21, 1975 [JP]  Japan .................................. 50-53786

[51] Int. Cl.² ........................ C01G 49/08; C04B 35/26
[52] U.S. Cl. .................................. 427/128; 427/127; 427/215; 428/403; 428/900; 252/62.56; 252/62.62
[58] Field of Search .......................... 252/62.56, 62.62; 427/127, 128, 215; 428/900, 402, 403

[56] References Cited

U.S. PATENT DOCUMENTS

| | | | |
|---|---|---|---|
| 2,906,979 | 9/1959 | Bozorth | 252/62.62 |
| 3,117,933 | 1/1964 | Abeck et al. | 252/62.56 |
| 3,382,174 | 5/1968 | Hund | 252/62.56 X |
| 3,573,980 | 4/1971 | Haller et al. | 252/62.56 X |
| 3,694,261 | 9/1972 | Makino et al. | 428/425 |
| 3,928,709 | 12/1975 | Audran et al. | 252/62.56 X |

FOREIGN PATENT DOCUMENTS

40-22,055  9/1965  Japan ..................................... 252/62.56

*Primary Examiner*—Jack Cooper
*Attorney, Agent, or Firm*—Craig & Antonelli

[57] ABSTRACT

Ferro-magnetic, acicular particles for a recording medium prepared by treating metal hydroxides, the metal component mainly consisting of iron and cobalt, with an oxidative gas in an aqueous alkaline medium wherein magnetic, acicular particles of iron oxide are present and crystallizing metal oxides resulting from the oxidation of the metal hydroxides on the surface of the magnetic, acicular particles of iron oxide.

8 Claims, 3 Drawing Figures

FERRO-MAGNETIC ACICULAR PARTICLES FOR RECORDING MEDIUM AND PROCESS FOR PREPARING THE SAME

This is a continuation of application Ser. No. 633,365 filed Nov. 19, 1975, which in turn is a continuation of Ser. No. 551,651 filed Feb. 21, 1975, which in turn is a continuation of Ser. No. 273,165, filed July 19, 1972, all now abandoned.

The present invention relates to ferro-magnetic, acicular particles for a recording medium (e.g. recording tape, recording sheet, recording drum, recording disc), particularly of high density, and their preparation.

The term "high density" herein used is intended to means a recording medium having a higher number of signals in a unit length.

With the intensification of magnetic recording density, demand was made for a recording medium of high coercive force. For this purpose, it has been proposed to use a uniform composition of magnetic particles consisting of iron oxide with a small amount of any other appropriate metal oxide such as cobalt oxide. The preparation of such magnetic particles is usually effected by crystallizing them out from an aqueous solution of an iron salt and any other metal salt, but the thus prepared particles are not uniform in size and their use for a recording medium produces noise and print through. In order to overcome such defect, it has been proposed to use acicular particles constituted with crystal nuclei of non-magnetic iron oxide and a coating of magnetic metal oxide provided on their surface. On the formation of the coating, however, the magentic metal oxide is apt to make nuclei by itself and the particles of uniform size are difficultly obtained. Further, the coating adheres unevenly on the surface of the crystal nuclei so that, when blended with a binder, the coating is apt to be eliminated so as to make inferior the magnetic characteristics of the acicular particles.

As the result of the extensive study, it has been found that magnetic, acicular particles of iron oxide having a coating of metal oxides, the metal component mainly consisting of iron and coblat, crystallized on their surface show a high coercive force and, when used for a recording medium, affords a prominent electro-magnetic characteristics. It has also been found that the incorporation of zinc into the said metal component can provide the resulting particles with a higher saturated magnetic flux density. The present invention is based on these findings.

For preparation of the ferro-magnetic, acicular particles of the present invention, magnetic, acicular particles of iron oxide (e.g. $\gamma$-$Fe_2O_3$, $Fe_3O_4$) as crystal nuclei are dispersed in an aqueous alkaline medium containing hydroxides of iron and cobalt with or without zinc hydroxide and an oxidative gas (e.g. air) is introduced therein whereby oxidation proceeds to produce oxides of iron and cobalt with or without zinc oxide, which are epitaxially crystallized on the surface of the crystal nuclei.

In preparation of the metal hydroxides, there may be used the corresponding metal salts such as ferrous sulfate, ferrous nitrate, ferrous chloride, cobalt sulfate, cobalt chloride, cobalt nitrate, zinc sulfate and zinc chloride.

The epitaxial growth of the metal oxides on the surface of the crystal nuclei may be considerably influenced by the concentration of alkali (e.g. sodium hydroxide, potassium hydroxide) in the aqueous medium and the temperature for oxidation. The presence of not less than about 0.5 mol equivalent of alkali, preferably about 1.0 to 2.0 mol equivalent, to 1 mol of the metal ion in the aqueous medium is usually required. Such concentration is advantageous in preventing the formation of the new crystal nuclei of the metal oxides themselves. When the concentration is less than the said lower limit, the growth of the crystals of the metal oxides takes a much longer time. In general, a higher oxidation temperature results in a more uniform growth of the crystals of the metal oxides and a more favorable magnetic property. However, a too high temperature is not preferred, because new crystal nuclei of the metal oxides are apt to be formed. Thus, the oxidation temperature may be usually room temperature or higher, preferably from about 60° to 100° C.

By the said procedure, the crystalline structure of the metal oxides as the coating can be the same as that of the crystal nuclei so that the coating adheres firmly thereon. Further, the metal oxides as the coating are per se ferro-magnetic so that any heat treatment such as reduction and oxidation can be omitted. Thus, the largeness of particles due to sintering does not occur, and ferro-magnetic, acicular particles of uniform size and even quality can be obtained. Furthermore, a desired coercive force and a saturated magnetic flux density can be readily obtained by varying appropriately the incorporation amount of cobalt and/ or zinc to that of iron.

Figure 1:
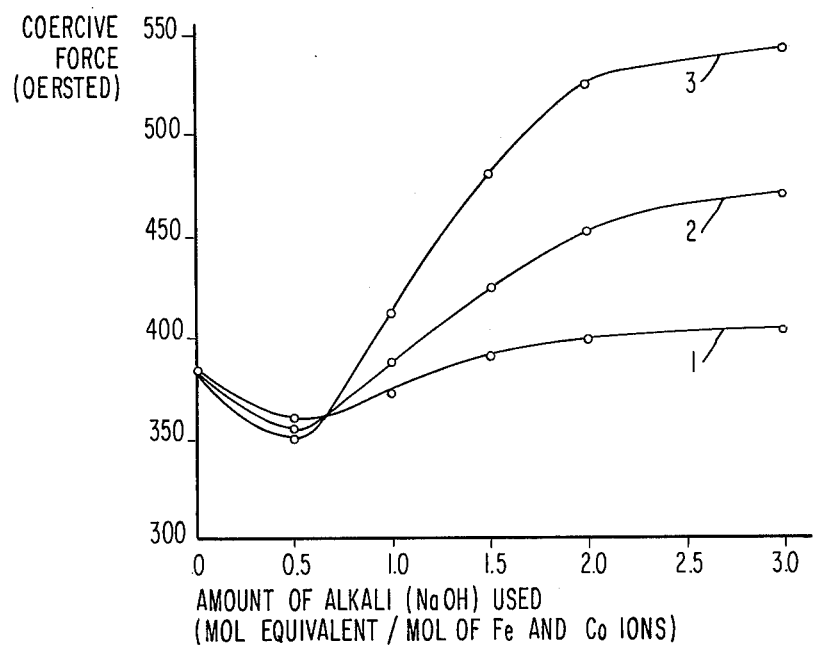
FIG. 1 is a graph showing the relationship between the coercive force of the ferro-magnetic, acicular particles and the amount of alkali employed.

Practical and presently preferred embodiments of the invention are illustratively shown in the following Examples.

EXAMPLE 1

An aqueous solution of ferrous sulfate (0.2 mol/ liter; 2 liters) and an aqueous solution of cobalt sulfate (0.2 mol/liter; 1 liter) are combined together to make a metal ion solution. To the metal ion solution (1 liter), an aqueous solution of sodium hydroxide (1.5 mol/liter; 1 liter) is added, whereby hydroxides of iron and cobalt are co-precipitated. Magnetic, acicular particles of $\gamma$-$Fe_2O_3$ (150 g) having 380 oersteds in coercive force and 4000 gauss in saturated magnetic flux density are added thereto. Into the resultant solution maintained at about 80° C., air is introduced at a rate of 3 liters per minute for 3 hours while stirring so that oxidation proceeds whereby oxides or iron and cobalt are crystallized on the acicular particles of $\gamma$-$Fe_2O_3$. The resultant particles are washed with water and dried to give ferro-magnetic, acicular particles of cobalt-containing iron oxide having about 470 oersteds in coercive force and about 4300 gauss in saturated magnetic flux density.

The above obtained ferro-magnetic, acicular particles (70 parts by weight) are admixed with with vinyl chloridevinyl acetate copolymer (22 parts by weight), dioctyl phthalate (7 parts by weight), toluene (100 parts by weight) and methyl isobutyl ketone (100 parts by weight) by the aid of a ball mill, and the resultant mixture is applied on the surface of a polyester film of 36 μ thick to make a coating of 14 μ thick after dryness. The thus prepared magnetic recording tape is about 420 oersteds in coercive force, about 1100 gauss in remanence magnetic flux density and about 0.7 in saturated remanence retention.

In the same manner as above, a variety of ferromagnetic, acicular particles of cobalt-containing iron oxide are prepared using a metal ion solution containing iron and cobalt ions in a total concentration of 0.2 mol per liter.

The relationship between the coercive force of the ferro-magnetic, acicular particles and the amount of alkali used when the oxidation temperature is 20° C., 60° C. and 80° C. is shown in FIG. 1 of the accompanying drawings wherein the curves 1, 2 and 3 represent those at the oxidation temperatures of 20° C., 60° C. and 80° C., respectively. From the said Figure, it is understood that a larger coercive force can be obtained with a higher oxidation temperature and also with a larger amount of alkali. When the amount of alkali is less than 0.5 mol equivalent, new crystal nuclei FeO(OH) are formed and the coercive force is lowered.

Figure 2:
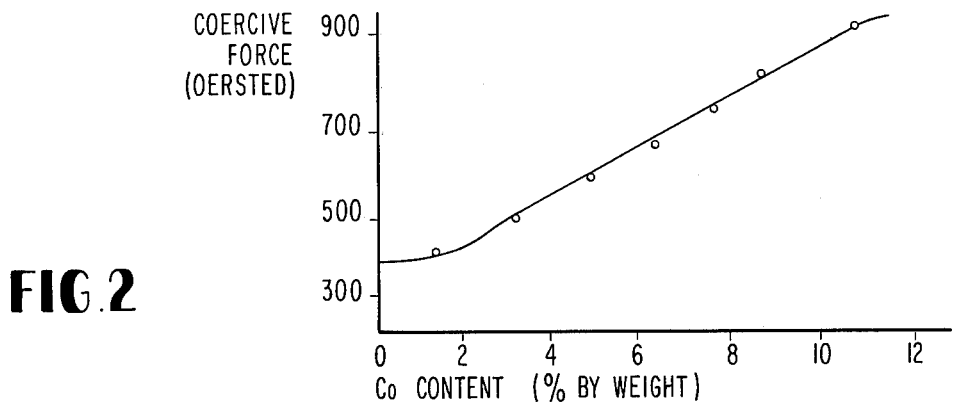
FIG. 2 is a graph showing the relationship of the content of cobalt in the ferro-magnetic, acicular particles and the coercive force obtained.

The relationship between the content of cobalt in the ferro-magnetic, acicular particles and the coercive force is shown in FIG. 2 of the accompanying drawings, from which it is understood that the coercive force is increased proportionally with the increase of the content of cobalt.

The coercive force and the saturated magnetic flux density of the ferro-magnetic, acicular particles according to the invention can be appropriately controlled by varying the composition of the coating on their surface. Such variation in the composition may be attained by changing the mixing ratio of iron and cobalt ions in the said metal ion solution.

To a metal ion solution containing iron and cobalt ions in a total concentration of 0.2 mol per liter (1 liter), an aqueous solution of sodium hydroxide (1.5 mol/liter; 1 liter) is added, whereby iron and cobalt hydroxides are coprecipitated. Magnetic, acicular particles of $\gamma$-$Fe_2O_3$ having 380 oersteds in coercive force and 4000 gauss in saturated magnetic flux density are added thereto. Into the resultant solution maintained at about 80° C., air is introduced at a rate of 3 liters per minute for 3 hours while stirring so that oxidation proceeds whereby oxides or iron and cobalt are crystallized on the acicular particles of $\gamma Fe_2O_3$. The coercive force (Hc) and the saturated magnetic flux density (Bs) of the resultant ferro-magnetic, acicular particles and the composition of the coating formed on their surface with the molar ratio of iron and cobalt ions in the metal ion solution employed are shown in the following Table:

Table

| No. | $Fe^{++}/Co^{++}$ (molar ratio) | Hc (oersted) | Bs (gauss) | Composition of coating |
|---|---|---|---|---|
| 1 | 2/1 | 470 | 4300 | $CoO \cdot Fe_2O_3$ |
| 2 | 2.3/0.7 | 460 | 4400 | $CoO_{0.7} \cdot FeO_{0.3} \cdot Fe_2O_3$ |
| 3 | 2.5/0.5 | 430 | 4550 | $CoO_{0.5} \cdot FeO_{0.5} \cdot Fe_2O_3$ |
| 4 | 2.7/0.3 | 410 | 4600 | $CoO_{0.3} \cdot FeO_{0.7} \cdot Fe_2O_3$ |

EXAMPLE 2

Ferrous sulfate (0.267 mol), cobalt sulfate (0.12 mol) and zinc sulfate (0.013 mol) are dissolved in water (2 liters) to make a metal ion solution. To the metal ion solution (1 liter), an aqueous solution of sodium hydroxide (1.2 mol/liter; 1 liter) is added, whereby hydroxides of iron, cobalt and zinc are co-precipitated. Magnetic, acicular particles of $\gamma$-$Fe_2O_3$ (150 g) as in Example 1 are added thereto. Into the resultant mixture maintained at about 60° C., air is introduced at a rate of 3 liters per minute for 3 hours while stirring so that oxidation proceeds whereby oxides of iron, cobalt and zinc are crystallized on the acicular particles of $\gamma$-$Fe_2O_3$. The resultant particles are washed with water and dried to give ferro-magnetic, acicular particles of cobalt and zinc-containing iron oxide having 600 oersteds in coercive force and about 4420 gauss in saturated magnetic flux density.

The above obtained ferro-magnetic, acicular particles are blended with vinyl chloride-vinyl acetate copolymer, dioctyl phthalate, toluene and methyl isobutyl ketone as in Example 1, and the resultant mixture is applied on the surface of a polyester film of 36 μ thick to make a coating of 14 μ thick after dryness. The thus prepared magnetic recording tape is about 540 oersteds in coercive force, about 1250 gauss in remanence magnetic flux density and about 0.72 in saturated remanence retention.

Figure 3:
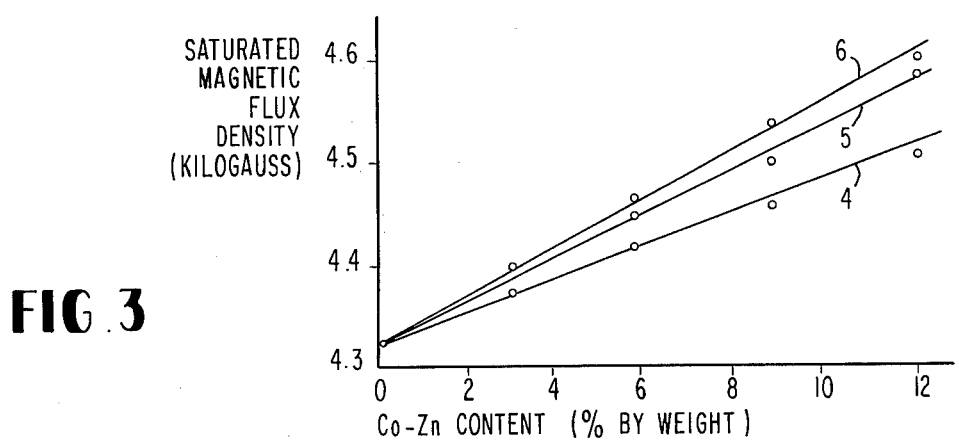
FIG. 3 is a graph showing the relationship between the contents of cobalt and zinc in the ferro-magnetic, acicular particles and the saturated magnetic flux density when the atomic ratio of cobalt and zinc is 9:1, 8:2 and 7:3.

The relationship between the contents of cobalt and zinc in the ferro-magnetic, acicular particles and the saturated magnetic flux density when the atomic ratio of cobalt and zinc is 9:1, 8:2 and 7:3 is shown in FIG. 3 of the accompanying drawings wherein the curves 4, 5 and 6 represent those at the Co/Zn atomic ratio of 9/1, 8/2 and 7/3, respectively. From the said Figure, it is understood that a higher saturated magnetic flux density can be obtained with a larger content of cobalt and zinc and also with a smaller Co/Zn atomic ratio. It is also understood that the increase of the content of cobalt and zinc results in a larger coercive force.

As understood from the above descriptions, the coating on the ferro-magnetic, acicular particles of the invention is so firmly bonded that it is scarcely eliminated from the nuclear crystal nuclei even when blended with a binder or any other material under a drastic condition. Thus, the ferro-magnetic, acicular particles hardly cause any material noise or print through. Moreover, it is greatly advantageous that desired magnetic characteristics, particularly high coercive force, can be readily produced by selecting an appropriate content of cobalt with or without zinc.

What is claimed is:

1. Ferro-magentic, acicular particles for a recording medium comprising magnetic, acicular particles of $\gamma$-$Fe_2O_3$ or $Fe_3O_4$ as crystal nuclei and a coating of magnetic metal oxides, the metal component of the metal oxides consisting essentially of iron and cobalt in a molar ratio of from 2:1 to 2.7:0.3, epitaxially crystallized on surfaces of said magnetic acicular particles of $\gamma$-$Fe_2O_3$ or $Fe_3O_4$.

2. Ferro-magnetic, acicular particles for a recording medium comprising magnetic, acicular particles of $\gamma$-$Fe_2O_3$ or $Fe_3O_4$ as crystal nuclei and a coating of magnetic metal oxides, the metal component of the metal oxides consisting essentially of iron, cobalt and zinc, epitaxially crystallized on surfaces of said magnetic acicular particles of $\gamma$-$Fe_2O_3$ or $Fe_3O_4$, the iron and cobalt being in a molar ratio of from 2:1 to 2.7:0.3, and the atomic ratio of cobalt to zinc in said metal component varying from 9:1 to 7:3 with the content of cobalt and zinc in the ferro-magnetic acicular particles being up to 12% by weight.

3. A process for preparing ferro-magnetic, acicular particles for a recording medium which comprises introducing an oxidizing gas into a dispersion containing metal hydroxides, the metal component of said metal hydroxides consisting essentially of ferrous iron and cobalt in a molar ratio of from 2:1 to 2.7:0.3, an aqueous alkaline solution and dispersed magnetic, acicular particles of $\gamma$-$Fe_2O_3$ or $Fe_3O_4$, not less than about 0.5 mole equivalent of an alkali being added to said solution per mole of metal ion in said solution and epitaxially crystallizing metal oxides resulting from the oxidation of said metal hydroxides on surfaces of the magnetic, acicular particles of $\gamma$-$Fe_2O_3$ or $Fe_3O_4$.

4. The process according to claim 3, wherein said dispersion further contains zinc hydroxide in an amount that will increase the saturated magnetic flux density of the resultant ferromagnetic, acicular particles.

5. The process according to claim 3, wherein salts of iron and cobalt are dissolved in water to make ion solution, an alkali is added to said solution whereby hydroxides of iron and cobalt are co-precipitated, the magnetic, acicular particles are present in the resultant dispersion, and air is introduced into the dispersion with stirring.

6. The process according to claim 3, wherein the temperature of the dispersion in which air is introduced is maintained at about 60° to 100° C.

7. A process for preparing ferro-magnetic, acicular particles for a recording medium comprising introducing air into an aqueous dispersion of (a) co-precipitated ferrous hydroxide and cobalt hydroxide, the co-precipitated ferrous hydroxide and cobalt hydroxide being co-precipitated from an aqueous solution containing not less than about 0.5 mole equivalent alkali for each equivalent of cobalt ion and ferrous ion in a molar ratio of iron to cobalt of from 2:1 to 2.7:0.3, and (b) magnetic, acicular particles of $\gamma$-$Fe_2O_3$, and the magnetic, acicular particles of $\gamma$-$Fe_2O_3$ and the co-precipitated iron hydroxide and cobalt hydroxide being dispersed in water by stirring, at room temperature or above and epitaxially crystallizing the metal oxides produced by the oxidation of said co-precipitated ferrous hydroxide and cobalt hydroxide with the air introduced into said dispersion on the surfaces of said magnetic, acicular particles of $\gamma$-$Fe_2O_3$ to thereby produce said ferro-magnetic, acicular particles.

8. The product of the process of claim 7.

* * * * *